United States Patent
Kannadassan

(10) Patent No.: US 12,505,257 B2
(45) Date of Patent: Dec. 23, 2025

(54) DECENTRALIZED CONFIGURATION INTEGRITY CHECK IN MICROSERVICES ENVIRONMENT

(71) Applicant: Microsoft Technology Licensing, LLC, Redmond, WA (US)

(72) Inventor: K. Balaji Kannadassan, Chennai (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 3 days.

(21) Appl. No.: 18/702,204

(22) PCT Filed: Jul. 27, 2022

(86) PCT No.: PCT/US2022/038413
§ 371 (c)(1),
(2) Date: Apr. 17, 2024

(87) PCT Pub. No.: WO2023/069163
PCT Pub. Date: Apr. 27, 2023

(65) Prior Publication Data
US 2025/0124174 A1    Apr. 17, 2025

(30) Foreign Application Priority Data
Oct. 18, 2021 (IN) .............................. 202141047030

(51) Int. Cl.
*G06F 21/64* (2013.01)
*G06F 9/50* (2006.01)
(Continued)

(52) U.S. Cl.
CPC ............... *G06F 21/64* (2013.01); *G06F 9/50* (2013.01); *G06F 9/546* (2013.01); *G06F 21/57* (2013.01);
(Continued)

(58) Field of Classification Search
None
See application file for complete search history.

(56) References Cited

U.S. PATENT DOCUMENTS 9,223,789 B1 * 12/2015 Seigle .................... G06F 16/113
10,396,995 B2 * 8/2019 Maximov ............... H04L 9/006
(Continued)

FOREIGN PATENT DOCUMENTS

CN    111124670 A  *  5/2020  ........... G06F 9/5072
CN    112398899 A     2/2021
(Continued)

OTHER PUBLICATIONS

Md Whaiduzzaman, Md. Julkar Nayeen Mahi, Alistair Barros, MD. Ibrahim Khalil, Colin Fidge and Rajkumar Buyya (BFIM: Performance Measurement of a Blockchain Based Hierarchical Tree Layered Fog-IoT Microservice Architecture); pp. 20; Published in Jul. 26, 2021.*

(Continued)

*Primary Examiner* — Ali H. Cheema
(74) *Attorney, Agent, or Firm* — ArentFox Schiff LLP

(57) ABSTRACT

The present application relates to messaging between instances of a microservice in a decentralized architecture. A computer device hosting an instance may include a memory storing instructions to operate a microservice and a processor. The instance receives a message for the microservice from another instance of the microservice, the message including a branch of a hash tree with at least a block for a root hash of a central node, one or more blocks for intermediate nodes, and a leaf block including message content. The instance places at least the leaf block into a local hash tree based on the branch of the hash tree. The instance verifies an integrity and an order of the message based on the root hash and the location of the leaf block in the local hash (Continued)

tree. The instance acts on the message content in response to verifying the integrity and the order.

11 Claims, 6 Drawing Sheets

(51) Int. Cl.
    *G06F 9/54*     (2006.01)
    *G06F 21/57*     (2013.01)
    *H04L 9/00*     (2022.01)
    *H04L 9/32*     (2006.01)

(52) U.S. Cl.
    CPC ............ *H04L 9/006* (2013.01); *H04L 9/3242* (2013.01); *H04L 9/3247* (2013.01); *H04L 9/50* (2022.05)

(56) References Cited

U.S. PATENT DOCUMENTS

| | | | |
|---|---|---|---|
| 10,645,153 B2* | 5/2020 | Hassan | H04L 67/34 |
| 2012/0114123 A1* | 5/2012 | Garcia Morchon | H04L 63/123 |
| | | | 380/270 |
| 2017/0078101 A1* | 3/2017 | Maximov | H04L 9/006 |
| 2019/0004871 A1* | 1/2019 | Sukhomlinov | G06F 9/5038 |
| 2020/0127814 A1 | 4/2020 | Ma | |
| 2020/0162264 A1* | 5/2020 | Zamani | H04L 9/3297 |
| 2020/0379854 A1* | 12/2020 | Zubair | G06F 12/0875 |
| 2021/0165680 A1* | 6/2021 | Laschinger | H04L 67/10 |
| 2021/0200609 A1* | 7/2021 | Petersen | G06F 9/546 |
| 2022/0400020 A1* | 12/2022 | Davies | H04L 9/3255 |
| 2024/0313979 A1* | 9/2024 | Garcia Morchon | G16B 50/30 |

FOREIGN PATENT DOCUMENTS

| | | | | |
|---|---|---|---|---|
| CN | 112905210 A | * | 6/2021 | ............ G06F 8/65 |
| CN | 113448812 A | * | 9/2021 | ............ G06F 11/327 |

OTHER PUBLICATIONS

Marcus Eisele (Microservices with Mo—Part Four: The Configuration Service); pp. 14; Published in Sep. 30, 2017.*

International Search Report and Written Opinion issued in International Patent Application No. PCT/US2022/038413 on Nov. 17, 2022.

* cited by examiner

DECENTRALIZED CONFIGURATION INTEGRITY CHECK IN MICROSERVICES ENVIRONMENT

CROSS-REFERENCE TO RELATED APPLICATIONS

This application is a 35 U.S.C. § 371 National Phase of PCT Application No. PCT/US2022/038413, filed on Jul. 27, 2022, which claims priority to Indian Patent Application number 202141047030, filed on Oct. 18, 2021, the disclosures of which are hereby incorporated by reference herein in their entireties.

BACKGROUND

A microservices environment refers to an application architecture in which an application is provided by multiple loosely coupled microservices. Each microservice may be deployed independently and may communicate with other microservices for the application. Each microservice may be independently testable, which may facilitate development and maintenance of each microservice.

A microservices environment may also facilitate decentralization and scaling. For example, instances of a microservice may be deployed in distributed locations to handle requests more locally than a central server. For instance, microservices that interact with end users (e.g., user interfaces) may be deployed in edge datacenters such that requests from the end users may be handled more quickly and network traffic may be reduced. Further, such distributed microservices may be scaled based on load. For example, a microservice at an edge datacenter may spawn additional instances of the microservice locally to handle a high volume of requests.

One issue with distributed microservices is verifying integrity of messages such as configuration messages at the distributed instances of the microservices. Conventionally, a centralized configuration server provides configuration information to each instance of a microservice. Although a centralized configuration server may verify the integrity of the configuration, the use of a centralized configuration server also mitigates some of the advantages of a distributed deployment. For example, requests for configuration messages from the central servicer may be slower than messages with other local instances of the microservice, and such requests may increase traffic at remote locations between the instance and the centralized configuration server.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an example, the disclosure provides an apparatus for messaging between instances of a microservice. The apparatus may include a memory storing instructions to operate a microservice and at least one processor coupled to the memory and configured to execute the instructions. The at least one processor may be configured to receive a message for the microservice from another instance of the microservice. The message includes a branch of a hash tree with at least a block for a root hash of a central node, one or more intermediate branch hash blocks, and a leaf block including message content. The at least one processor may be configured to determine a location of the leaf block in a local hash tree based on the branch of the hash tree. The at least one processor may be configured to verify an integrity and an order of the message based on the root hash and the location of the leaf block in the local hash tree. The at least one processor may be configured to act on the message content in response to verifying the integrity and the order.

In another aspect, the disclosure provides a method of messaging between instances of a microservice. The method may include receiving a message for the microservice from another instance of the microservice, the message including a branch of a hash tree with at least a block for a root hash of a central node, one or more intermediate branch hash blocks, and a leaf block including message content. The method may include determining a location of the leaf block in a local hash tree based on the branch of the hash tree. The method may include verifying an integrity and an order of the message based on the root hash and the location of the leaf block in the local hash tree. The method may include acting on the message in response to verifying the integrity and the order In another aspect, the disclosure provides a network system for providing a microservice. The network system includes a plurality of servers configured to host at least one instance of the microservice. Each instance of the microservice configures a respective host server to receive a message for the microservice from a neighbor instance of the microservice. The message includes a branch of a hash tree with at least a block for a root hash of a central node, one or more intermediate branch hash blocks, and a leaf block including message content. Each instance of the microservice configures a respective host server to determine a location of the leaf block in a local hash tree based on the branch of the hash tree. Each instance of the microservice configures a respective host server to verify an integrity and an order of the message based on the root hash and the location of the leaf block in the local hash tree. Each instance of the microservice configures a respective host server to act on the message in response to verifying the integrity and the order.

In some implementations, the message is a configuration message for the microservice. Acting on the message may include performing a configuration commit for the microservice based on the configuration message. Additionally, the microservice instance may write a new block to the local hash tree in response to the configuration commit; and distribute the new block to one or more instances of the microservice.

In some implementations, the microservice instance may periodically perform an integrity check of the message based on the local hash tree including one or more new blocks; and obtain a copy of the message from the central node if the integrity check fails.

In some implementations, the instance of the microservice may obtain a copy of the message from the central node if the integrity or the order of the message is not verified based on the root hash and the location of the message in the local hash tree.

In some implementations, the microservice instance is a new microservice instance scaled from the other microservice instance of one of the intermediate nodes.

In some implementations, the microservice instance may periodically receive the root hash from the central node.

In some implementations, to verify the order of the message, the microservice instance may compare a timestamp in the message to a timestamp of a root hash of the local hash tree.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to providing verification of messages received at an instance of a microservice. The instance may be deployed remotely (e.g., in an edge datacenter) and may receive the message from another instance of the microservice. The microservice may verify both an integrity and order of the message. For example, for a configuration message, the microservice may verify that a configuration included in the configuration message originated at a central configuration node. The microservice may also verify that the configuration message is current (e.g., that no configuration messages were skipped and that there are no more recent configuration messages.).

In an aspect, the microservice may utilize a hash tree to verify the received message. The received message may include at least part of a branch of a hash tree. For example, the received message may include at least a root hash of a central node, one or more branch hashes for intermediate nodes. The received message may include a leaf block that contains message content. A hash block may refer to a hash and additional optional information. For example, a root hash block may include a root hash for a hash tree and a timestamp of the root hash. As another example, a branch hash block may include a hash of two or more lower nodes and some information about a location of the hash or the lower nodes. In some implementations, the leaf block may indicate whether the leaf block falls on a left side or a right side of the branch hash.

Figure 4:
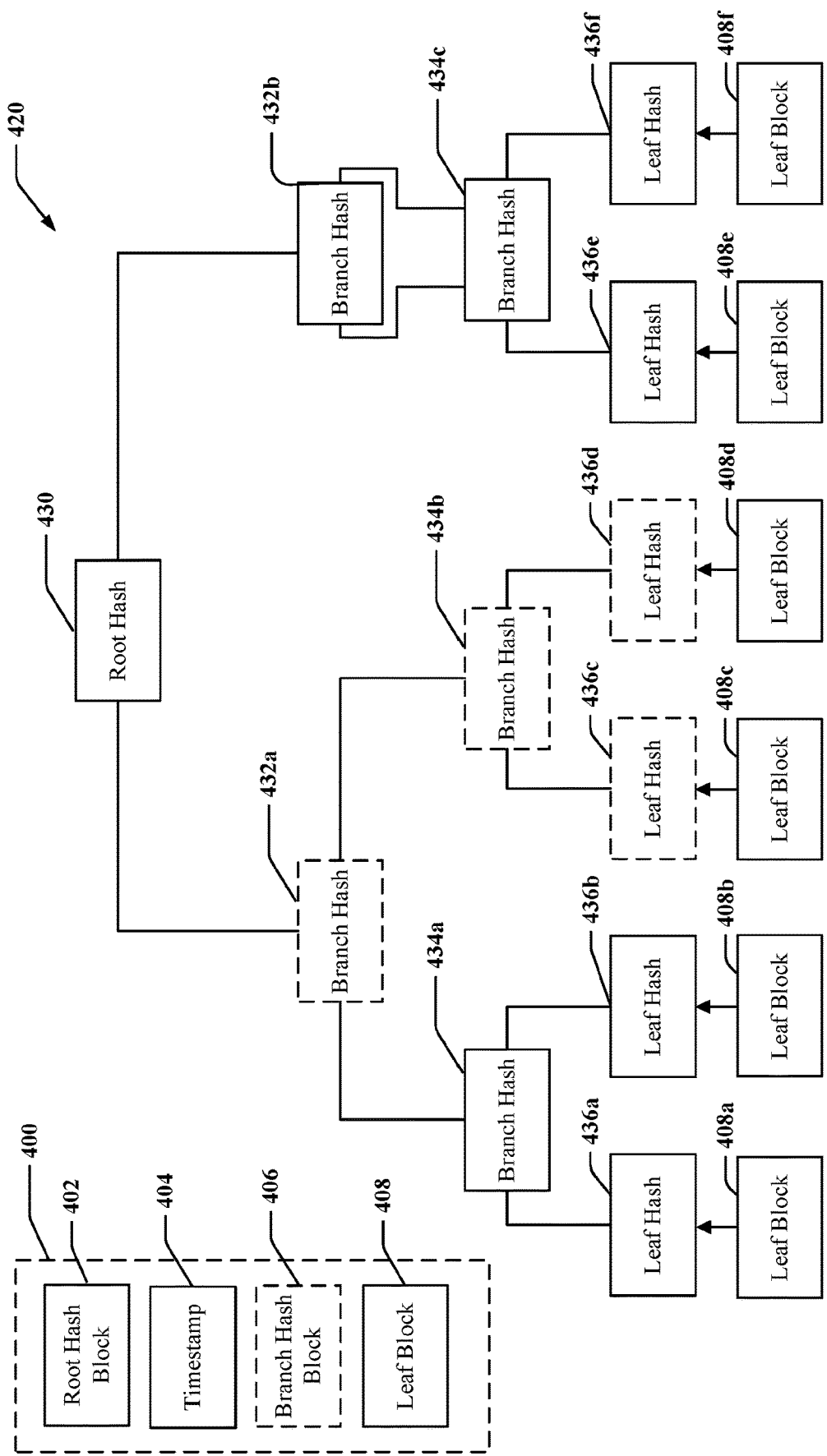
FIG. 4 illustrates an example of a message and a hash tree for verifying the message.
Figure 5:
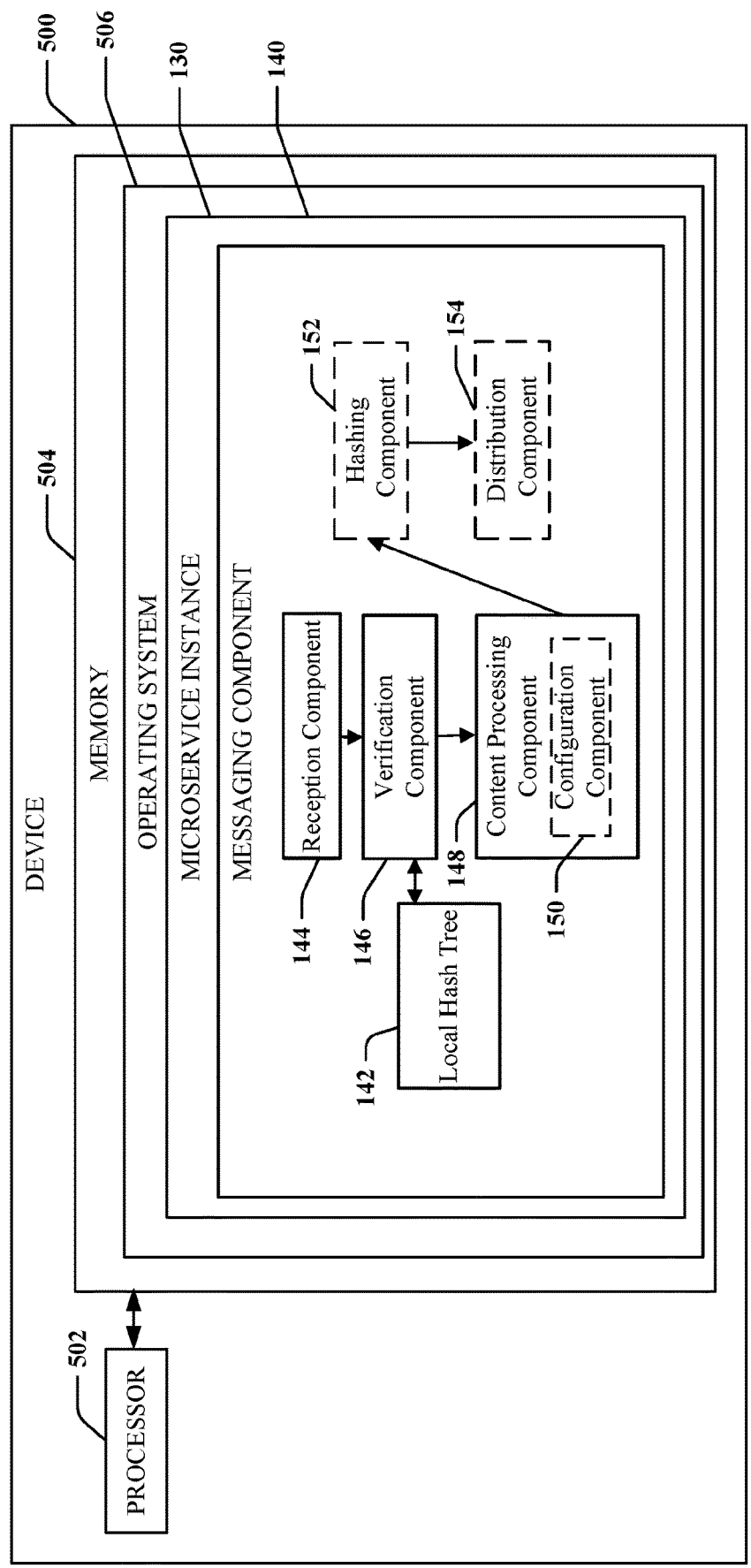
FIG. 5 is a schematic diagram of an example of an apparatus for executing an instance of a microservice having a messaging component.
Figure 6:
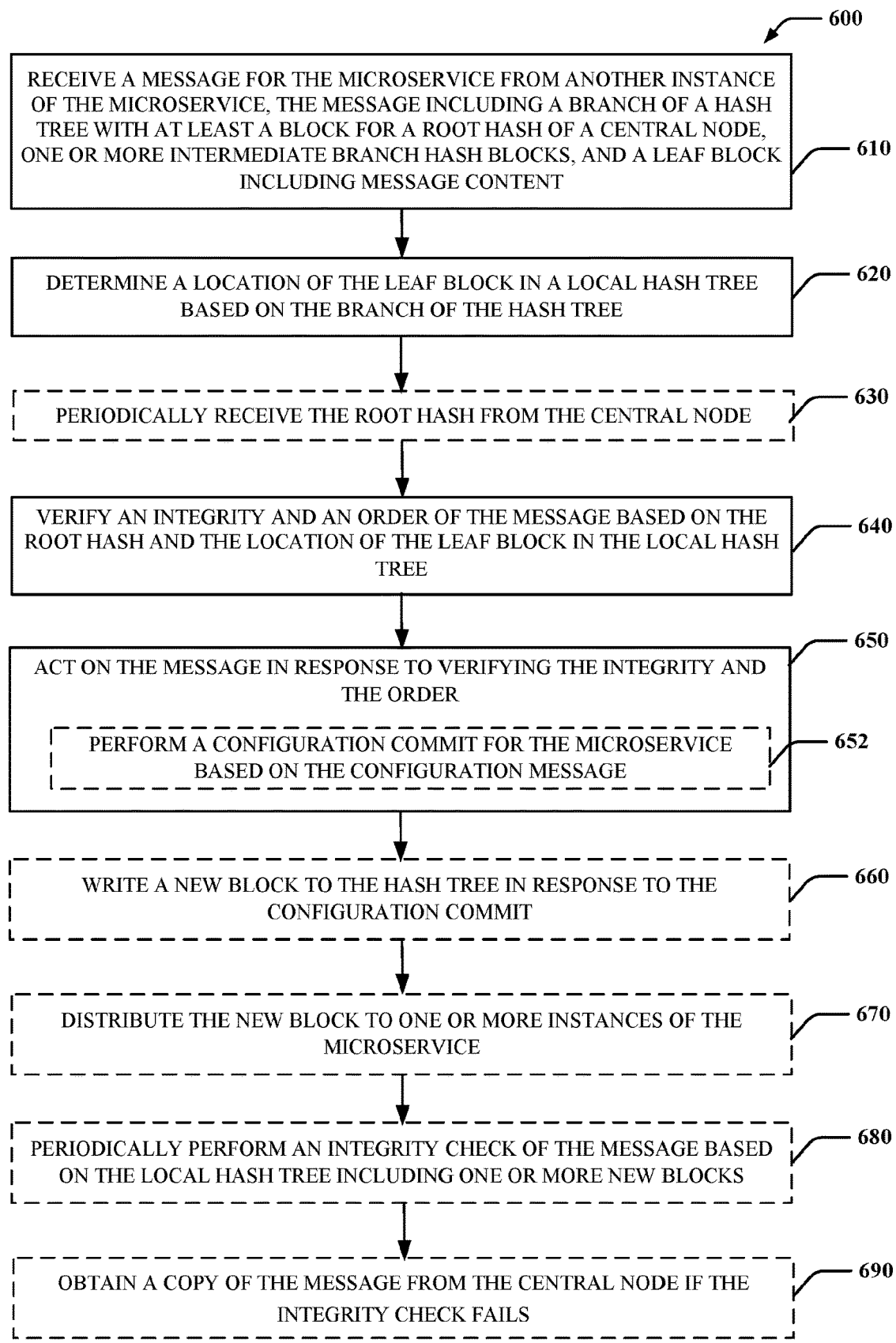
FIG. 6 is a flow diagram of an example of a method for a microservice instance to verify a message in a distributed architecture.

Turning now to FIGS. 1-7, examples are depicted with reference to one or more components and one or more methods that may perform the actions or operations described herein, where components and/or actions/operations in dashed line may be optional. Although the operations described below in FIG. 6 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

Figure 1:
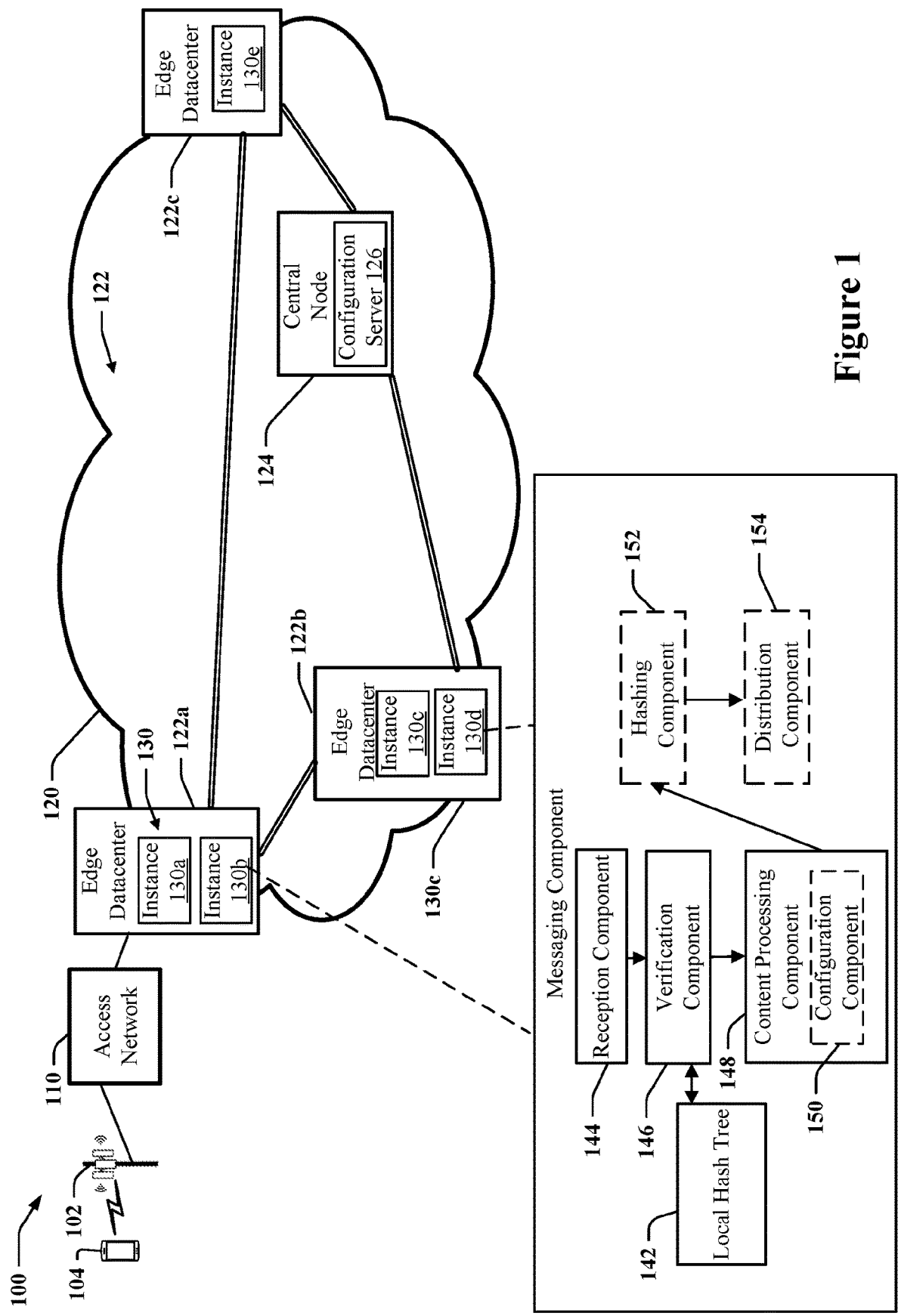
FIG. 1 is a diagram of an example of a microservices architecture, in accordance with aspects described herein.

FIG. 1 is a conceptual diagram 100 of an example of an architecture for a microservice deployed in a network 120. The network 120 may be, for example, a wide area network (WAN). The network 120 may be connected to other networks such as an access network 110 to provide services to devices 104 (e.g., via a base station 102). For example, a service may be an application that includes multiple microservices. Each microservice may be deployed as multiple instances 130 (e.g., instances 130a, 130b, 130c, 130d, and 130e) of the microservice that execute on computing resources of the network 120. For example, a microservice that provides a user interface of the application to user devices 104 may be instantiated on edge datacenters 122. The edge datacenters 122 (e.g., edge datacenters 122a, 122b, and 122c) may include peering connections to other networks (e.g., access network 110). In contrast, a central node 124 that includes, for example, a configuration server 126 may reside at a central datacenter.

Each instance 130 may include executable code for providing the microservice. In an aspect, each instance 130 may also include a messaging component 140 that provides for communication between instances 130 of the microservice and the central node 124. For example, the messaging component 140 may provide for distribution of configuration messages among the instances 130. The messaging component 140 may allow an instance 130 to obtain messages from a neighbor instance 130 (e.g., located at the same edge datacenter 122, a nearby edge datacenter 122, or an intermediate data center) rather than directly from the central node 124. In an aspect, the content of the messages may originate at the central node 124 and the messaging component 140 may verify both the integrity of the received message and an order of the received message. For example, the messaging component 140 may verify the integrity based on a root hash block included in the message. For instance, the messaging component 140 may compute the root hash based on a local hash tree when the leaf blocks for the hash tree are received. A matching root hash may verify the integrity of the received leaf blocks end to end. The messaging component 140 may verify the order of the received message based on a timestamp and the position of a received message in a hash tree. For example, when the leaf block indicates a side of the branch hash, the messaging component 140 may determine whether a leaf hash of the leaf block is attached all the way to the root hash, or if there are missing leaf blocks in the hash tree. The messaging component 140 may request a specific subtree from a neighbor instance (e.g., if a right leaf is received and a left leaf of the branch hash is missing). The messaging component 140 may also act on the received message. For example, in the case of a configuration message, the messaging component 140 may commit the configuration included in the configuration message. Additionally, it should be understood that different microservices for an application may include a messaging component 140 for the microservice.

The messaging component 140 may be configured to receive, verify, and act on received messages. In an aspect, the messaging component 140 may include a local hash tree 142 that stores a data structure for the messages. For example, the hash tree 142 may represent a configuration of the microservice.

The messaging component 140 may include a reception component 144 configured to receive a message for the microservice from another instance of the microservice. The message may include a branch of a hash tree with at least a block for a root hash of a central node, one or more blocks for intermediate nodes, and a leaf block including message content. The messaging component 140 may include a verification component 146 configured to verify an integrity and an order of the message based on the root hash and the location of the message in the local hash tree. The messaging component 140 may include a content processing component 148 configured to act on the message content in response to verifying the integrity and the order. For example, the content processing component 148 may optionally include a configuration component 150 configured to process the content of a configuration message. The configuration component 150 may perform a configuration commit for the microservice based on the configuration message.

In some implementations, the messaging component 140 may include a hashing component 152 configured to write a new block to the hash tree in response to the configuration commit. The messaging component 140 may also include a distribution component 154 configured to distribute the new block to one or more instances of the microservice.

Figure 2:
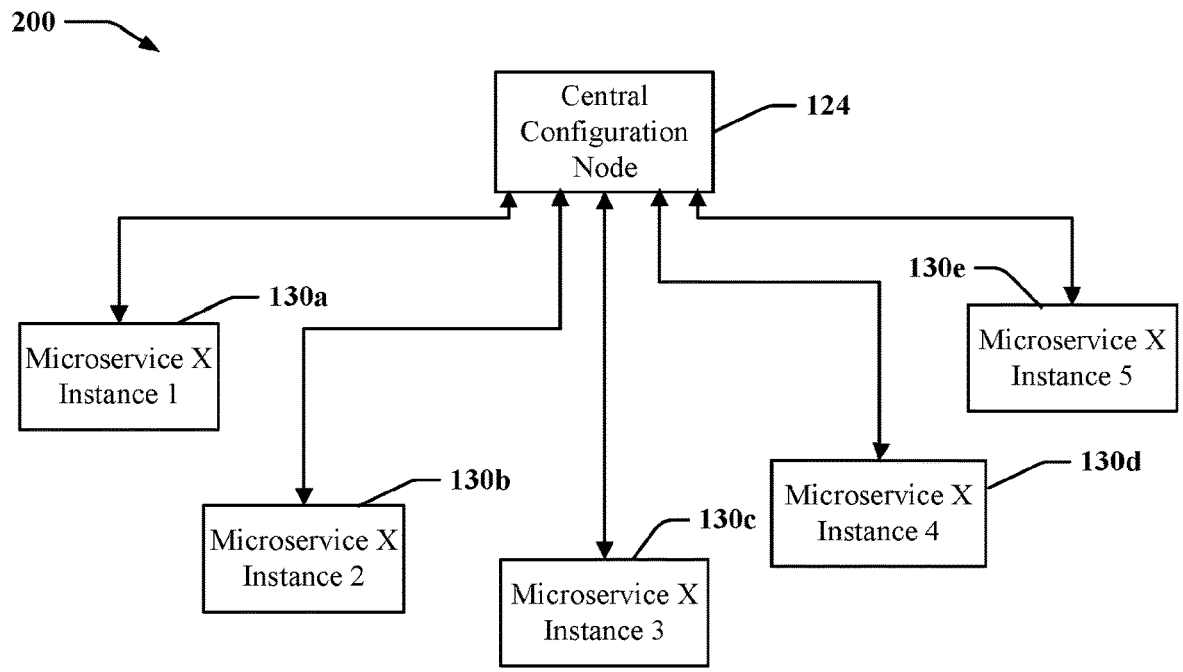
FIG. 2 is a diagram of an architecture for centralized distribution of configurations for a microservice.

FIG. 2 is a diagram of an architecture 200 for centralized distribution of configurations for a microservice. Each instance 130 of a microservice (e.g., ("Microservice X") may obtain a configuration from a central configuration node 124. For example, the central configuration node 124 may be a configuration server and the address of the configuration server may be specified in the code for the microservice such that each instance requests configuration from the central configuration node 124. The central configuration node 124 may be verified based on the code for the microservice. Accordingly, the architecture 200 offers simple verification of configurations.

The architecture 200, however, may have scaling and robustness issues. For example, the single configuration server may receive multiple requests when there is a configuration update. Some microservice instances 130 may be located far away from the single configuration server. Accordingly, due to processing load and distance, updates for some microservice instances may be slow. Further, a single configuration server may be a single point of failure.

Figure 3:
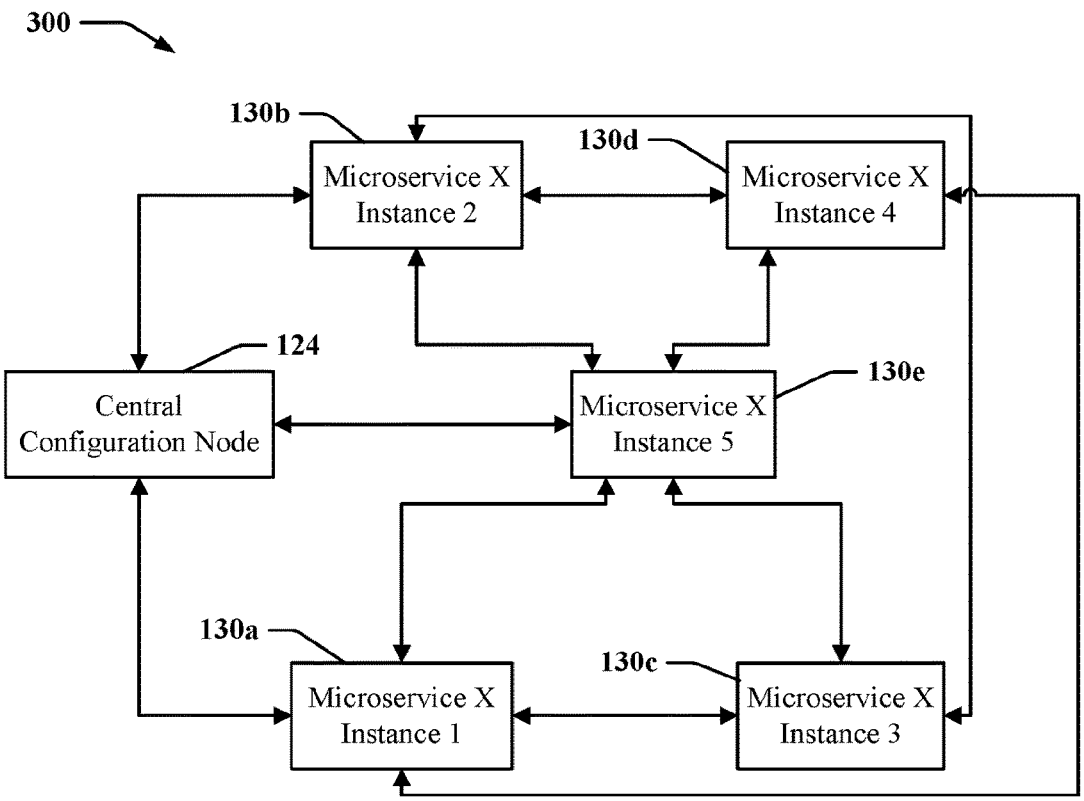
FIG. 3 is a diagram of an architecture for decentralized distribution of configurations for a microservice.

FIG. 3 is a diagram of an architecture 300 for decentralized distribution of configurations for a microservice. Each instance 130 of a the microservice ("Microservice Y") may include the messaging component 140 for receiving a configuration message from the central configuration node 124 or another instance of the microservice. For example, one or more of the instances of the microservice (e.g., instances 1, 2, or 5, may obtain a configuration message including a configuration from the central configuration node 124. When an instance performs a configuration commit, the instance may generate a new configuration message for distribution to other instances. As discussed in detail below, the messages may utilize a hash tree to provide verification of integrity and order of the configuration. Accordingly, microservice instances 130 may obtain configurations from different sources. In comparison to the architecture 200, the decentralized architecture 300 may reduce the load on the central configuration node 124 and improve speed of responses to configuration requests. For example, an instance of the microservice at the same or nearby edge datacenter may more quickly respond to and transfer the configuration message than the central configuration node 124.

In an aspect, the architecture 300 may facilitate an exchange of root hash and timestamp advertisement across a group of peer instances. One peer instance may be designated as a master instance. For example, the peer instance may be selected based on age (e.g., spawning instance is master) or election (e.g., voting based on round trip time). The root hash and time stamps may propagate from master to peer and from peers to other peers. The architecture 300 may include a hierarchy of nodes, for example, represented by a directional graph. A parent node may sent a keep alive message to child nodes. If a keep alive message is not received from a parent node, the child node may reach out to the master node. If a message is missed because an intermediate peer node (e.g., the parent) is not reachable, the child node may receive the message from the master instance. The master instance can remove the unreachable node from the graph, and connect the master instance to the child node and push the change to other nodes. Messages may be signed by a parent node such that the child node can validate authenticity. The instances may be chained such that the master instance can learn from a single node about all peers in the graph.

FIG. 4 illustrates an example of a message 400 and a hash tree 420 for verifying the message. The message 400 may include a branch of the hash tree 420. For example, the branch may include at least at least a root hash block 402 for a root hash of a central node 124, one or more branch hash blocks 406 for intermediate nodes, and a leaf block 408 including message content. In some implementations, the leaf block 408 or the branch hash block 406 includes an indication of whether the leaf block is on the left or the right of the branch hash. More generally, the message 400 may be published with sufficient information to update the hash tree 420. In some implementations, each hash block may be cryptographically signed by a node that generated the block. For example, the central node 124 may sign the root hash block 402. In some implementations, the message 400 includes a timestamp 404 of the root hash block 402.

The hash tree 420 may be a data structure that stores messages such as configuration messages. The hash tree 420 may include a plurality of leaf hashes 436 (e.g., 436a-f), where each leaf hash 436 is a hash of a previously received leaf block 408 (e.g., 408a-408f). The hash tree 420 may include branch hashes 432 and 434 that are hashes of a combination of lower level hashes. For example the branch hash 434a may be a hash of the concatenation of the leaf hash 436a and leaf hash 436b. A root hash 430 may effectively be a hash of all lower level hashes.

In an aspect, each message 400 includes a leaf block 408 containing the contents of the message 400. The leaf block 408 may be labeled with a leaf hash computed based on the leaf block 408. When an instance 130 of the microservice receives a message 400, the instance 130 may verify the content in the leaf block 408 based on whether the leaf block 408 can be placed in the hash tree 420. The instance 130 may store the local hash tree 142, which may be incomplete. For example, the local hash tree 142 may not have all of the leaf blocks 408 or branch hashes 434, 432.

The instance 130 and/or verification component 146 may compute the leaf hash 436 based on the leaf block. The instance 130 may verify that the leaf hash 436 is included in the root hash block 402 and that the root hash block 402 matches the root hash 430. The instance 130 and/or verification component 146 may verify a branch of the hash tree 420 by verifying each hash between the leaf hash 436 and the root hash 430. For example, the verification component 146 may compute the branch hash 434a based on the leaf hash 436a (e.g., a new leaf block 408) and leaf hash 436b (e.g., previously received). If the branch hash 434b is not included in the local hash tree 142, the instance 130 may request additional blocks. For example, requesting branch hash 432a and specifying the right side branches for the branch hash 432a may result in receiving leaf blocks 408c and 408d from neighbor instances, then calculate the branch hash 434b. In some implementations, the message 400 may include the branch hash block 406 including the branch hash 434b and branch hash 432a. The branch hash block 406 may also include a signature of one or more other nodes (e.g., an intermediate node). In such implementations, the verification component 146 may verify the location of the leaf block 408 without requesting additional blocks, for example, based on the signatures of the branch hash block 406 and root hash block 402. There may be a tradeoff between a message size and number of messages needed to verify each message. For example, the number of branch hash blocks 406 included in a message increases the message size (e.g., on the order of several bytes), but may reduce a need to request missing blocks. In contrast, if the instance 130 likely has the other blocks, leaving the branch hash blocks 406 out of the message 400 may reduce the message size. If, however, there is a missing block, the roothash computation may fail and the instance 130 may request additional blocks, including previously received blocks because of a lack of information about the structure of the hash tree 420.

FIG. 5 is a schematic diagram of an example of an apparatus 500 (e.g., a computing device) for executing an instance of a microservice having a messaging component 140. The apparatus 500 may be implemented as one or more computing devices in the network 120.

In an example, apparatus 500 can include a processor 502 and/or memory 504 configured to execute or store instructions or other parameters related to providing an operating system 506, which can execute one or more applications or processes, such as, but not limited to, a microservice instance 130, which may include a messaging component 140. For example, processor 502 and memory 504 may be separate components communicatively coupled by a bus (e.g., on a motherboard or other portion of a computing device, on an integrated circuit, such as a system on a chip (SoC), etc.), components integrated within one another (e.g., processor 502 can include the memory 504 as an on-board component), and/or the like. Memory 504 may store instructions, parameters, data structures, etc. for use/execution by processor 502 to perform functions described herein.

In an example, the messaging component 140 may include the local hash tree 142, the reception component 144, the verification component 146, and the content processing component 148. The messaging component 140 may optionally include the configuration component 150, the hashing component 152, and/or the distribution component 154.

The local hash tree 142 may be configured to store a local copy of the hash tree 420. The local hash tree 142 may be constructed as the instance 130 receives messages 400. The local hash tree 142 may be updated by the verification component 146.

The reception component 144 may be configured to receive the message 400 from another instance 130. The reception component 144 may include a physical or virtual network interface. For example, the reception component 144 may process IP packets addressed to the instance 130 to receive the message 400. The reception component 144 may provide the message 400 to the verification component 146.

The verification component 146 may be configured to verify the integrity and the order of the message 400. For example, the verification component 146 may attempt to update the local hash tree 142 by placing at least the leaf block 408 of a received message 400 into the local hash tree 142. The verification component 146 may check that a leaf hash 436 of the new leaf block 408 fits into the branch (e.g., by generating the branch hashes 434 and 432 up to the root hash 430). The content processing component 148 may be configured to act on the message content of the message 400. In the case of a configuration message, the content processing component 148 may include a configuration component 150 configured to perform a configuration commit based on the message content. In some implementations, the content processing component 148 may pass the message content to another component of the microservice instance. For example, if the message content is a database update request, the content processing component may provide the message content to a database management component (not shown).

The optional hashing component 152 may be configured to write a new block to the local hash tree in response to the configuration commit. For example, the hashing component 152 may generate the leaf hash 436 and a new branch hashes up to the root hash 430. In some implementations, the hashing component 152 may sign the leaf hash and/or one or more branch hash blocks 406.

The optional distribution component 154 may be configured to distribute the new block to one or more instances 130 of the microservice. For example, the distribution component 154 may maintain a list of subordinate instances. The subordinate instances may include, for example, instances spawned by the current instance 130. In some implementations, the subordinate instances may include instances that have previously requested messages from the current instance. By distributing new blocks to the subordinate instances, the distribution component 154 may propagate messages in a decentralized architecture 300.

FIG. 6 is a flow diagram of an example of a method 600 for verifying messages for a microservice instance. For example, the method 600 can be performed by the apparatus 500 and/or one or more components thereof to implement an instance 130 of a microservice with a decentralized architecture 300 (e.g., for configuration).

At block 610, the method 600 includes receiving a message for the microservice from another instance of the microservice, the message including a branch of a hash tree with at least a block for a root hash of a central node, one or more intermediate branch hash blocks, and a leaf block including message content. In an example, the reception component 144, e.g., in conjunction with processor 502, memory 504, and operating system 506, can receive the message 400 for the microservice from another instance 130 of the microservice. The message 400 may include a branch of a hash tree 420 with at least a block for a root hash (e.g., root hash block 402) of a central node 124 and one or more intermediate branch hash blocks 406 in the branch, and a leaf block 408 including message content. In some implementations, the message 400 includes a timestamp 404 of the root hash block 402. In some implementations, the branch hash block 406 or the leaf block 408 indicates whether the leaf block 408 is on a left side or right side of a branch hash in the hash tree 420.

At block 620, the method 600 includes determining a location of the leaf block in a local hash tree based on the branch of the hash tree. In an example, the messaging component 140 and/or the verification component 146, e.g., in conjunction with processor 502, memory 504, and operating system 506, can determine the location of the leaf block 408 in the local hash tree 142 based on the branch of the hash tree. For example, where the branch hash block 406 or the leaf block 408 indicates whether the leaf block 408 is on a left side or right side of a branch hash in the hash tree 420, the verification component 146 may find a branch hash 434 or 432 corresponding to the received branch hash block 406, and determine the location of the leaf block based on the indication. As another example, in some implementations, a hash function to generate the branch hash may be an exclusive or (XOR) function. Given a leaf block 408 and its parent branch hash (e.g., from branch hash block 406), the verification component 146 may determine the expected leaf block with which this received block will form the branch hash. Accordingly, the verification component 146 may determine whether the hash tree 420 includes an adjacent leaf hash 436. In some implementations, the verification component 146 may determine that a leaf hash of the leaf block is not attached to the root hash in the local hash tree indicating a missing leaf block. The verification component 146 may cause the reception component 144 to request a branch of the hash tree that contains the missing leaf block from the other instance of the microservice.

At block 630, the method 600 may optionally include periodically receiving the root hash from the central node. In an example, the messaging component 140 and/or the reception component 144, e.g., in conjunction with processor 502, memory 504, and operating system 506, can periodically receive the root hash 430 from the central node 124.

At block 640, the method 600 includes verifying an integrity and an order of the message based on the root hash and the location of the leaf block in the local hash tree. In an example, the messaging component 140 and/or the verification component 146, e.g., in conjunction with processor 502, memory 504, and operating system 506, can verify the integrity and the order of the message based on the root hash and the location of the leaf block in the local hash tree. For example, to verify the integrity of the message 400, the verification component 146 may generate a leaf hash 436 based on the leaf block 408. The verification component 146 may combine the leaf hash 436 with another leaf hash 436 on the same branch, and verify a branch hash 434. The verification component 146 may verify hashes (e.g., branch hash 432) up to the root hash 430. The verification component 146 may also verify the root hash 430 against the root hash block 402. For example, to verify the order of the message 400, the verification component 146 may verify that the local hash tree 142 includes previous leaf blocks.

The verification component 146 may verify the order of the message 400 relative to previous messages based on the timestamp 404. For example, the verification component 146 may compare the timestamp 404 to a timestamp of the root hash 430. If the timestamp 404 of the timestamp 404 is more recent than the root hash 430, the verification component 146 may verify the order of the message 400.

At block 650, the method 600 includes acting on the message in response to verifying the integrity and the order. In an example, the messaging component 140 and/or the content processing component 148, e.g., in conjunction with processor 502, memory 504, and operating system 506, can act on the message in response to verifying the integrity and the order. For example, at sub-block 652, where the message 400 is a configuration message, the content processing component 148 and/or the configuration component 150 may perform a configuration commit for the microservice based on the configuration message. Other example actions that may be performed by the content processing component 148 in response to the message include updating a database or taking over request or workload from another instance.

At block 660, the method 600 may optionally include writing a new block to the hash tree in response to the configuration commit. In an example, the messaging component 140 and/or the hashing component 152, e.g., in conjunction with processor 502, memory 504, and operating system 506, can write a new block (e.g., leaf block 408) to the hash tree 420 in response to the configuration commit.

At block 670, the method 600 may optionally include distributing the new block to one or more instances of the microservice. In an example, the messaging component 140 and/or the distribution component 154, e.g., in conjunction with processor 502, memory 504, and operating system 506, can distribute the new block (e.g., leaf block 408) to one or more instances 130 of the microservice. For example, the distribution component 154 may send a message similar to the message 400 to the one or more instances 130. The message may include a branch hash block 406 as the instance will be an intermediate node for recipients of the message. The instances 130 may be new instances spawned from the current instance. For example, when the instance 130 spawns new instances (e.g., to scale the microservice), the instance 130 and/or distribution component 154 may keep track of IP addresses of the spawned instances. As another example, the instance 130 may be designated as a master instance and other instances may be subordinate instances. In some implementations, a master instance may be for a region or a physical location such as a datacenter 122. The master instance may be selected based on a priority, an age, or an election scheme. The master instance may maintain a lock for the microservice. For instance, the central node 124 may recognize only one master instance per region or datacenter. The other instances may store an identifier of the master instance (e.g., an IP address), and when other instances fail a verification, the other instances may read the lock details and reach the master instance to receive a message or configuration. If an instance is successful in re-election as the master instance when an original master instance goes down, the instance may check the root hash validity with the main configuration node (e.g., central node 124) and become the master instance.

At block 680, the method 600 may optionally include periodically performing an integrity check of the message based on the local hash tree including one or more new blocks. In an example, the messaging component 140 and/or the verification component 146, e.g., in conjunction with processor 502, memory 504, and operating system 506, can periodically perform an integrity check of the message 400 based on the local hash tree 142 including one or more new blocks. For example, the messaging component 140 may not receive a message (e.g., during a restart event for the instance 130). The messaging component 140 may periodically synchronize with peer instances 130 to determine whether an update occurred (e.g., if the root hash 430 matches a root hash 430 of the peers). For example, when maintaining the root hash 430, the messaging component 140 may check the timestamp 404 of the last block added and the hashes included in the root hash block 402. When a new message is received and the root hash check fails, the messaging component 140 can retrieve a current root hash and retry all of the blocks past that root hash to the current root hash.

At block 690, the method 600 may optionally include obtaining a copy of the message from the central node if the integrity check fails. In an example, the messaging component 140 and/or the verification component 146, e.g., in conjunction with processor 502, memory 504, and operating system 506, can obtain a copy of the message from the central node if the integrity check fails for the root hash.

Figure 7:
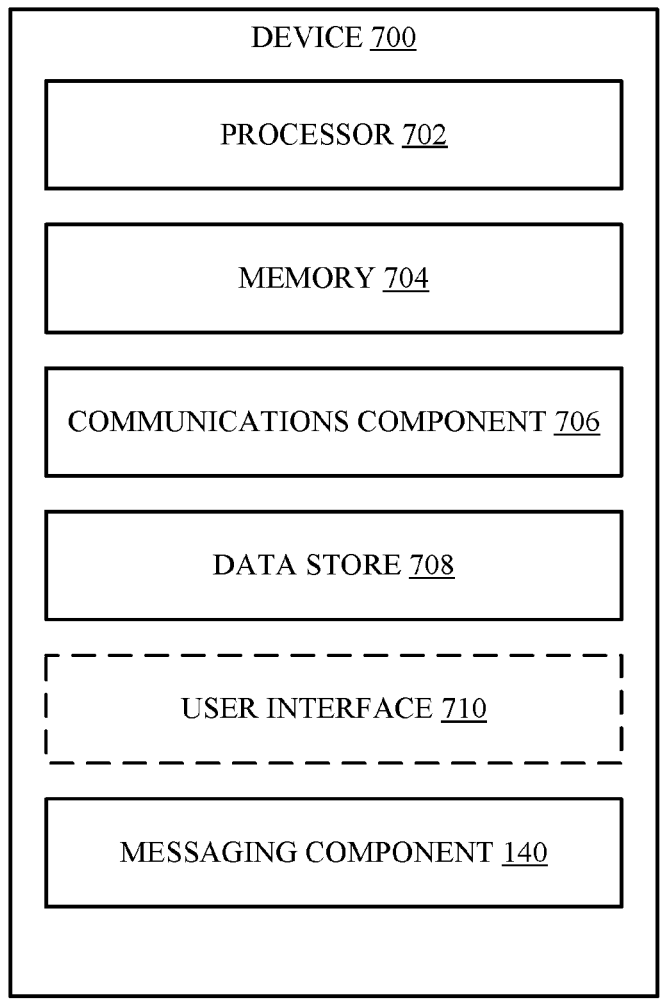
FIG. 7 illustrates an example of a device 700 including additional optional component details as those shown in FIG. 5.

FIG. 7 illustrates an example of a device 700 including additional optional component details as those shown in FIG. 5. In one aspect, device 700 may include processor 702, which may be similar to processor 502 for carrying out processing functions associated with one or more of components and functions described herein. Processor 702 can include a single or multiple set of processors or multi-core processors. Moreover, processor 702 can be implemented as an integrated processing system and/or a distributed processing system.

Device 700 may further include memory 704, which may be similar to memory 504 such as for storing local versions of operating systems (or components thereof) and/or applications being executed by processor 702, such as the microservice instance 130, the messaging component 140, the reception component 144, the verification component 146, the content processing component 148, the hashing component 152, the distribution component 154, etc. Memory 704 can include a type of memory usable by a computer, such as random access memory (RAM), read only memory (ROM), tapes, magnetic discs, optical discs, volatile memory, non-volatile memory, and any combination thereof.

Further, device 700 may include a communications component 706 that provides for establishing and maintaining communications with one or more other devices, parties, entities, etc. utilizing hardware, software, and services as described herein. Communications component 706 may carry communications between components on device 700, as well as between device 700 and external devices, such as devices located across a communications network and/or devices serially or locally connected to device 700. For example, communications component 706 may include one or more buses, and may further include transmit chain components and receive chain components associated with a wireless or wired transmitter and receiver, respectively, operable for interfacing with external devices.

Additionally, device 700 may include a data store 708, which can be any suitable combination of hardware and/or software, that provides for mass storage of information, databases, and programs employed in connection with aspects described herein. For example, data store 708 may be or may include a data repository for operating systems (or components thereof), applications, related parameters, etc. not currently being executed by processor 702. In addition, data store 708 may be a data repository for the messaging component 140.

Device 700 may optionally include a user interface component 710 operable to receive inputs from a user of device 700 (e.g., datacenter maintenance personnel) and further operable to generate outputs for presentation to the user. User interface component 710 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 710 may include one or more output devices, including but not limited to a display, a speaker, a haptic feedback mechanism, a printer, any other mechanism capable of presenting an output to a user, or any combination thereof.

Device 700 may additionally include a messaging component 140 for messaging with other instances of a microservice in a decentralized architecture, a reception component 144 for receiving a message for the microservice from another instance of the microservice, the message including a branch of a hash tree with at least a block for a root hash of a central node, one or more blocks for intermediate nodes, and a leaf block including message content, a verification component 146 for placing at least the leaf block into a local hash tree based on the branch of the hash tree and verifying an integrity and an order of the message based on the root hash and the location of the leaf block in the local hash tree, and a content processing component 148 for acting on the message in response to verifying the integrity and the order, etc.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. A computer device hosting an instance of a microservice, the instance comprising:
   a memory storing instructions to operate the microservice; and
   at least one processor coupled to the memory and configured to execute the instructions to:
   receive a message for the microservice from another instance of the microservice, the message including a branch of a hash tree with at least a block for a root hash of a central node, one or more intermediate branch hash blocks for intermediate nodes, and a leaf block including message content,
   wherein the message is a configuration message for the microservice;
   determine a location of the leaf block in a local hash tree based on the branch of the hash tree;
   verify an integrity and an order of the message based on the root hash and the location of the leaf block in the local hash tree; and
   act on the message content included in the leaf block, in response to verifying the integrity and the order of the message, comprising performing a configuration commit for the microservice based on the configuration message.

2. The computer device of claim 1, wherein the at least one processor is configured to: write a new block to the local hash tree in response to the configuration commit; and distribute the new block to one or more instances of the microservice.

3. The computer device of claim 1, wherein the at least one processor is configured to: periodically perform an integrity check of the message based on the local hash tree including one or more new blocks; and obtain a copy of the message from the central node if the integrity check fails.

4. The computer device of claim 1, wherein the at least one processor is configured to obtain a copy of the message from the central node if the integrity or the order of the message is not verified based on the root hash and the location of the message in the local hash tree.

5. The computer device of claim 1, wherein the instance of the microservice is a new microservice instance scaled from another microservice instance of one of the intermediate nodes.

6. The computer device of claim 1, wherein the at least one processor is configured to periodically receive the root hash from the central node.

7. The computer device of claim 1, wherein to verify the order of the message, the at least one processor is configured to compare a timestamp in the message to a timestamp of a root hash of the local hash tree.

8. A method, being implemented by an instance of a microservice, comprising:
   receiving a message for the microservice from another instance of the microservice, the message including a branch of a hash tree with at least a block for a root hash of a central node, one or more intermediate branch hash blocks for intermediate nodes, and a leaf block including message content,
   wherein the message is a configuration message for the microservice;
   determining a location of the leaf block in a local hash tree based on the branch of the hash tree;
   verifying an integrity and an order of the message based on the root hash and the location of the leaf block in the local hash tree; and
   acting on the message content included in the leaf block, in response to verifying the integrity and the order of the message, comprises performing a configuration commit for the microservice based on the configuration message.

9. The method of claim 8, further comprising: writing a new block to the hash tree in response to the configuration commit; and distributing the new block to one or more instances of the microservice.

10. The method of claim 8, further comprising: periodically performing an integrity check of the message based on the local hash tree including one or more new blocks; and obtaining a copy of the message from the central node if the integrity check fails.

11. The method of claim 8, further comprising: obtaining a copy of the message from the central node if the integrity or the order of the message is not verified based on the root hash and the location of the leaf block in the local hash tree.

* * * * *